US012502897B2

(12) United States Patent
Yanaka

(10) Patent No.: US 12,502,897 B2
(45) Date of Patent: Dec. 23, 2025

(54) LIQUID DISCHARGE APPARATUS INCLUDING SEPARATED DISCHARGE PATH AND EXHAUST CHANNEL

(71) Applicant: Atsushi Yanaka, Saitama (JP)

(72) Inventor: Atsushi Yanaka, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 141 days.

(21) Appl. No.: 18/519,985

(22) Filed: Nov. 27, 2023

(65) Prior Publication Data

US 2024/0174000 A1 May 30, 2024

(30) Foreign Application Priority Data

Nov. 28, 2022 (JP) ................................ 2022-189472

(51) Int. Cl.
*B41J 11/00* (2006.01)
*B41J 29/13* (2006.01)
*B41J 29/377* (2006.01)

(52) U.S. Cl.
CPC .... *B41J 11/00218* (2021.01); *B41J 11/00214* (2021.01); *B41J 11/00216* (2021.01); *B41J 29/13* (2013.01); *B41J 29/377* (2013.01)

(58) Field of Classification Search
CPC ............ B41J 11/00218; B41J 11/00214; B41J 11/00216; B41J 29/13; B41J 29/377; B41J 2/1714; B41J 2/175; B41J 2/14
See application file for complete search history.

(56) References Cited

U.S. PATENT DOCUMENTS

| | | | |
|---|---|---|---|
| 2013/0063506 A1 | 3/2013 | Yanaka | |
| 2013/0182025 A1 | 7/2013 | Yanaka | |
| 2014/0285554 A1 | 9/2014 | Yanaka et al. | |
| 2016/0243820 A1 | 8/2016 | Yanaka et al. | |
| 2016/0355007 A1 | 12/2016 | Morino et al. | |
| 2019/0275810 A1 | 9/2019 | Matsuki et al. | |
| 2022/0314660 A1 | 10/2022 | Saiga et al. | |
| 2022/0314663 A1 | 10/2022 | Saiga et al. | |

FOREIGN PATENT DOCUMENTS

| | | | |
|---|---|---|---|
| CN | 209616672 U | * 11/2019 | |
| CN | 215921590 U | 3/2022 | |
| JP | 2009-172937 A | 8/2009 | |
| JP | 2010-000735 A | 1/2010 | |
| JP | 2019-001034 A | 1/2019 | |
| JP | 7105978 B1 | 7/2022 | |
| KR | 10-1100938 B1 | 12/2011 | |
| WO | 2023/026577 A1 | 3/2023 | |

OTHER PUBLICATIONS

Extended European Search Report issued Mar. 14, 2024 in European Patent Application No. 23211829.9, 8 pages.

* cited by examiner

*Primary Examiner* — Bradley W Thies
(74) *Attorney, Agent, or Firm* — XSENSUS LLP

(57) ABSTRACT

A liquid discharge apparatus includes: a head to discharge a liquid onto a medium along a discharge path; an irradiator adjacent to the head to irradiate the liquid on the medium with a curing light to cure the liquid on the medium, the irradiator including a housing; a suction port from which air is inhaled into the housing to cool the irradiator, an exhaust port from which the air is exhausted outside the housing through an exhaust channel; and a partition to separate the exhaust channel from the discharge path.

9 Claims, 12 Drawing Sheets

LIQUID DISCHARGE APPARATUS INCLUDING SEPARATED DISCHARGE PATH AND EXHAUST CHANNEL

CROSS-REFERENCE TO RELATED APPLICATIONS

This patent application is based on and claims priority pursuant to 35 U.S.C. § 119(a) to Japanese Patent Application No. 2022-189472, filed on Nov. 28, 2022, in the Japan Patent Office, the entire disclosure of which are hereby incorporated by reference herein.

TECHNICAL FIELD

The present embodiment relates to a liquid discharge apparatus.

RELATED ART

A liquid discharge apparatus discharges ink, which is cured when the ink is irradiated with light such as ultraviolet light, from a head that discharges the ink. The liquid discharge apparatus has irradiators that irradiate the ink landed on a medium with light at either end of the head.

A printer equipped with irradiators has a configuration in which outside air is sucked and blown through a suction port to cool the irradiators. After an interior of the irradiator is cooled, the heated air inside the irradiators is exhausted outside the irradiators through an exhaust port.

SUMMARY

According to an aspect of the present disclosure, a liquid discharge apparatus includes: a head to discharge a liquid onto a medium along a discharge path; an irradiator adjacent to the head to irradiate the liquid on the medium with a curing light to cure the liquid on the medium, the irradiator including a housing; a suction port from which air is inhaled into the housing to cool the irradiator; an exhaust port from which the air is exhausted outside the housing through an exhaust channel; and a partition to separate the exhaust channel from the discharge path.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
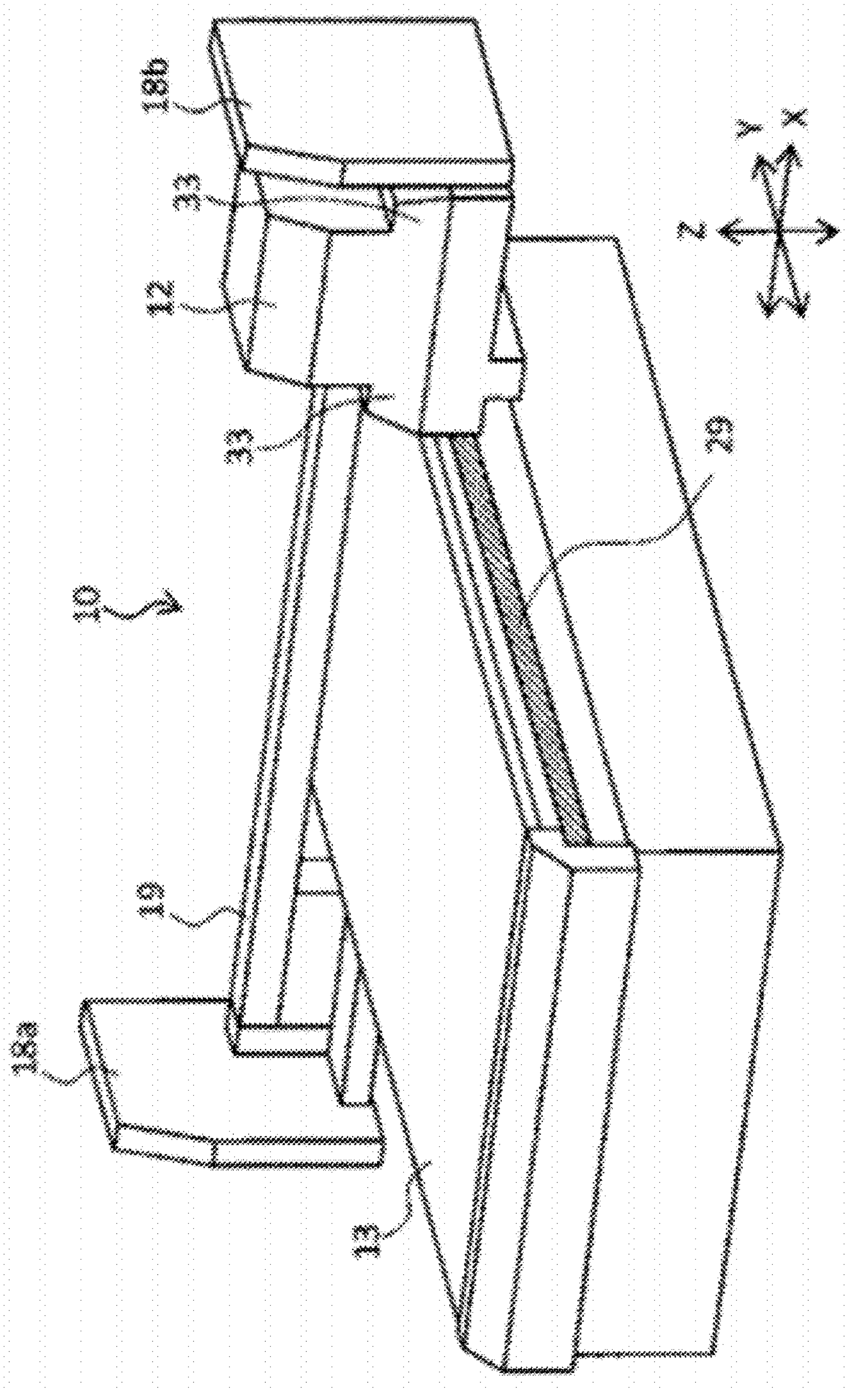
FIG. 1 is a view of the general arrangement of a recording apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Hereinafter, a liquid discharge head, a liquid discharge module, and a liquid discharge apparatus according embodiments of the present embodiment will be described in detail with reference to the drawings. The following embodiments illustrate a liquid discharge head, a liquid discharge module, and a liquid discharge apparatus for embodying the technical idea of the present embodiment, and it is not limited to the following embodiments. Unless specifically described, dimensions, materials, shapes, and relative arrangements of components described in the embodiments are not intended to limit the scope of the present disclosure only thereto, and are merely illustrative examples. The size and positional relationship of members illustrated in the drawings are sometimes magnified for clarity of description. In the following description, the same names and reference signs indicate the same or similar members, and detailed description thereof will be omitted as appropriate.

The following is a description of specific examples, with reference to the accompanying drawings. Embodiments are not limited to the specific examples described below.

Example Configuration of a Liquid Discharge Apparatus

In the description below, a specific example is explained with reference to the accompanying drawings. Embodiments are not limited to the specific examples described below.

Example Configuration of a Liquid Discharge Apparatus

In the description below, an inkjet recording apparatus (hereinafter referred to as the “recording apparatus 10”) illustrated in FIG. 1 is described as an example of a liquid discharge apparatus. Further, so-called ultraviolet (UV) ink (hereinafter, simply referred to as “ink”) in which droplets are cured when irradiated with ultraviolet light is described as an example. Accordingly, the head in the following examples is a clear ink head (a Cl head that will be hereinafter referred to simply as the "head"). Furthermore, an example in which the recording medium is paper sheets is described.

Combinations of light and droplets to be used are not limited to the combination of ultraviolet light and UV ink. For example, the light may include infrared light, electron beams, or the like. The droplets are of a type that cures when irradiated with the light to be used. Accordingly, this configuration may be infrared irradiation, electron beam (EB) irradiation, or the like.

FIG. 1 is a view of the general arrangement of a recording apparatus.

Hereinafter, the horizontal direction will be referred to as the "X direction". In the example described below, the X direction is also the main scanning direction.

The direction orthogonal to the X direction will be referred to as the "Y direction". In the following example, the Y direction is also a sub-scanning direction.

Accordingly, the X-Y plane coincides with the plane of a paper sheet placed on a stage 13.

The direction perpendicular to the X-Y plane, which is the plane of the paper sheet, will be referred to as the "Z direction".

The recording apparatus 10 includes a carriage 12 and the stage 13 on which a recording medium is placed. In the example mechanism described below, the stage 13 and the paper sheet on the stage 13 are fixed in position, and the carriage 12 moves and rotates. For ease of explanation, the plane of the recording medium is assumed to be the same as the plane of the stage 13.

The carriage 12 has a head equipped with a plurality of nozzles.

The head discharges ink from the nozzles, to record dots and form an image. The ink cures when irradiated with ultraviolet light.

The nozzles are arranged to face the stage 13.

Irradiators 33 include a light source that emits ultraviolet light. The irradiators 33 emit light of a wavelength that cures the ink discharged from the nozzles. In the description below, the irradiators 33 are integrated with the carriage 12. In this configuration, the irradiators 33 move together with the recording head in the X direction, the Y direction, and the Z direction, as the carriage 12 moves in parallel.

A gantry 19 is a member that serves as a bridge between a left side plate 18*a* and a right side plate 18*b*.

The carriage 12 moves in the X direction, the Y direction, and the Z direction. Therefore, the recording apparatus 10 may have an actuator or a moving mechanical component on each axis.

Movement in the X direction is achieved by the carriage 12 moving along a guide rail on the gantry 19.

Movement in the Y direction is achieved by the carriage 12 moving along guide rails 29 on the right and left sides of the stage 13.

Movement in the Z direction is achieved by a mechanism by which the carriage 12 moves up and down.

Movement in the X direction, the Y direction, and the Z direction may be achieved by a configuration other than the above.

Therefore, it is sufficient that the carriage 12 can move in the X direction, the Y direction, and the Z direction, regardless of the types of the actuator and the mechanical component that achieves parallel movement. Further, there may be a degree of freedom other than the above.

In the example described above, the carriage 12 moves in the X direction, the Y direction, and the Z direction. As for the degree of freedom in one of the directions, however, it is sufficient that the stage 13 or a paper sheet moves, and the position of the carriage 12 moves relative to the paper sheet.

Example Operation

Figure 2:
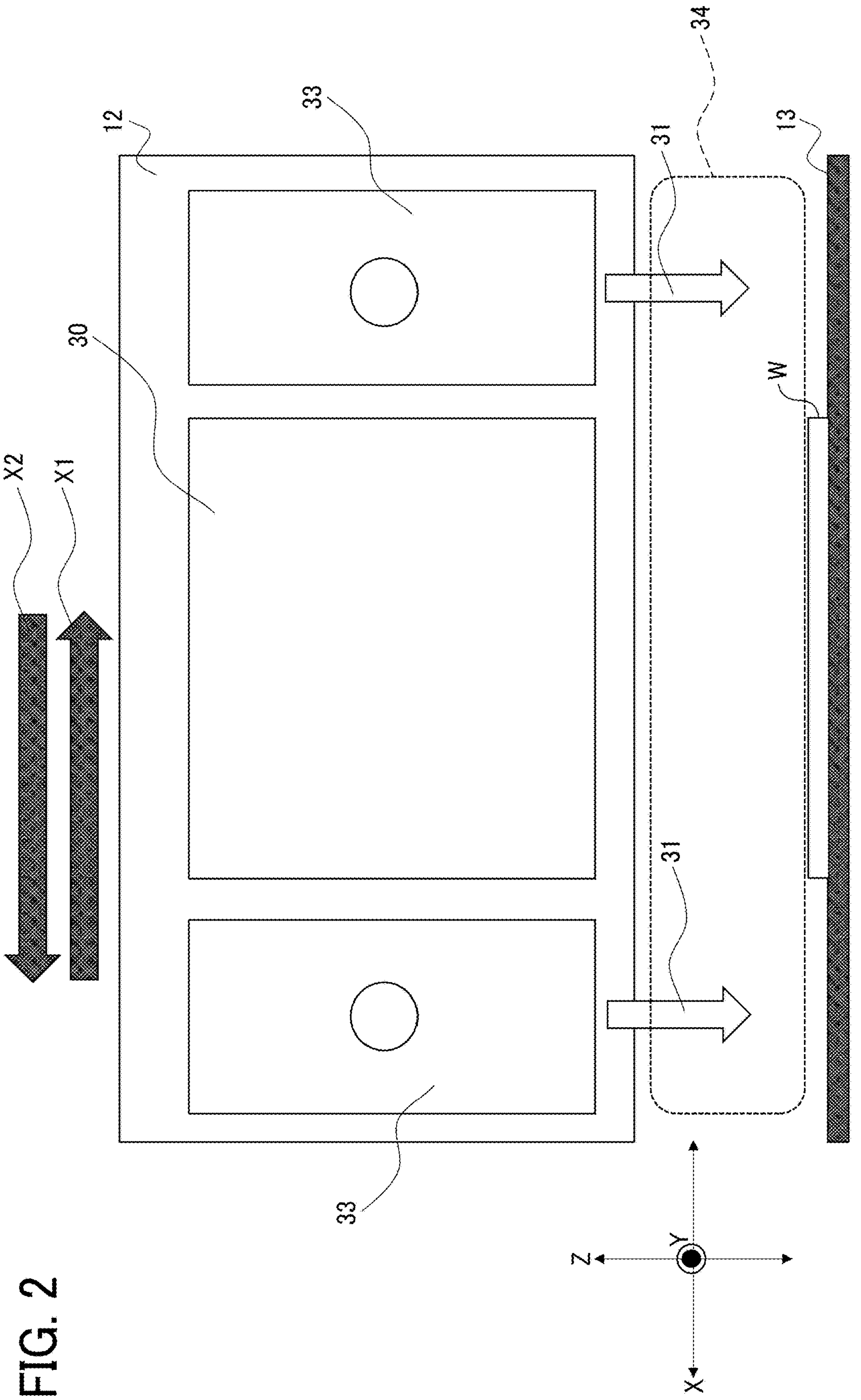
FIG. 2 is a diagram illustrating an example operation.

FIG. 2 is a diagram illustrating an example operation. In the example description below, a paper sheet W is positioned on the stage 13. The carriage 12 moves in a forward path X1 and a backward path X2 in the X-axis direction.

The carriage 12 includes a head unit 30. The head unit 30 is an example of an image forming unit that performs image formation, and a discharging unit. The head unit 30 includes a head, and discharges ink onto the paper sheet W.

For example, two irradiators 33 are disposed in the X-axis direction so as to sandwich the head unit 30.

The number and the positions of the irradiators 33 may be the number and the positions illustrated in FIG. 2. The irradiators 33 emits ultraviolet light 31.

The ultraviolet light 31 is UV-A, UV-B, or UV-C, for example. The irradiators 33 includes a light source that is a high-pressure mercury lamp, a metal halide lamp, an electrodeless UV lamp, a UV laser, a xenon lamp, an LED lamp, or a sterilization lamp, for example.

If an LED lamp is used, low power consumption or long life can be achieved. The peak illuminance of an electrode lamp at 365 nm is several $W/cm^2$. On the other hand, in the case of a light source that is an LED lamp using a 395-nm or 405-nm band, the peak illuminance is several tens of $W/cm^2$, which is several times the intensity of an electrode lamp.

The light source is selected in accordance with the photopolymerization initiator that is part of the ink, and is ideally selected in accordance with the absorption characteristics of the photopolymerization initiator. For example, if the reaction peak wavelength of the photopolymerization initiator is 365 nm, a light source that emits light having a strong wavelength region of 300 nm to 450 nm is desirable. Specifically, the light source is preferably a metal halide lamp or the like. If the reaction peak wavelength of the photopolymerization initiator is 240 nm, the light source is preferably a high-pressure mercury lamp or the like.

If an electrode lamp is used, light can be emitted over a wide wavelength range. If an LED lamp is used, on the other hand, it is possible to emit light having a narrow emission spectrum around the center wavelength.

Furthermore, if controlling of the irradiation conditions (such as the emission wavelength, the leveling time, and the irradiation intensity, for example) is performed in addition to image formation using two or more kinds of ultraviolet lamps having different emission wavelengths and an ink containing a photopolymerization initiator that reacts with the emission wavelength of each lamp, image quality can be partially increased.

First Example Configuration

Figure 3:
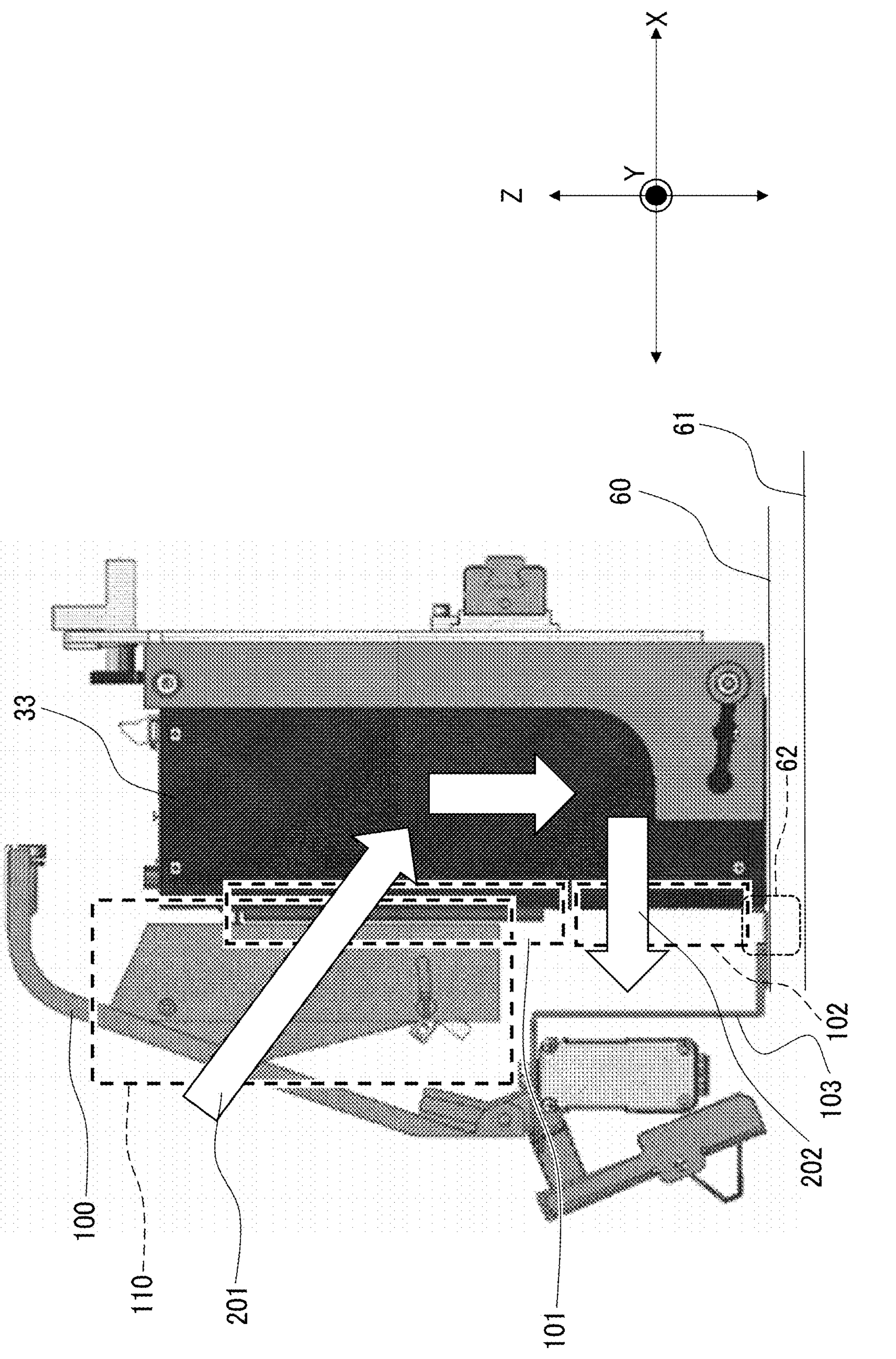
FIG. 3 is a diagram illustrating a first example configuration.

FIG. 3 is a view of a first example configuration. In the description below, the structure around the irradiators 33 is explained.

When operated, the irradiators 33 generate heat, and serve as a heat source. Therefore, the irradiator 33 is preferably cooled by air. Therefore, the recording apparatus 10 includes an intake portion that takes the gas for cooling the irradiators 33 into the housing of the irradiators 33. Specifically, the intake portion is a suction port 101.

When the outside air is taken in through the suction port 101, the air can be taken into the housing to cool the irradiators 33. Specifically, air is taken into the housing by the suction port 101 so that the outside air flows in a channel (hereinafter referred to as a "suction channel 201") extending in the housing. When the air taken into the suction channel 201 is used for cooling, the air is heated from the time when the air is taken in, and therefore, turns into high-temperature air.

The recording apparatus 10 includes an exhaust portion that exhausts the high-temperature gas from the inside of the housing of the irradiators 33. Specifically, the exhaust portion is an exhaust port 102. For example, the exhaust port 102 is formed at a position lower than the suction port 101. When the air in the housing is exhausted by the exhaust port 102, the air is exhausted from the inside of the housing so as to flow in a channel (hereinafter referred to as an "exhaust channel 202") extending from the inside of the housing to the outside.

The inside of the housing then has a complicated airflow, because of the suction channel 201, the exhaust channel 202, and the like.

The recording apparatus 10 includes a blocker. Specifically, the blocker is an L-shaped sheet-metal cover (hereinafter referred to simply as "L-shaped plate 103").

For example, as illustrated in FIG. 2, the L-shaped plate 103 is installed so as to have a shape and a position that separates the exhaust channel 202 from a discharge path (hereinafter referred to as a "discharge path 34") extending to the location at which the ink discharged from the head lands on the paper sheet W.

Thus, the blocker serves as a partition or a separator to separate the exhaust channel 202 from the discharge path.

As the exhaust channel 202 is separated (blocked) from the discharge path 34, it is possible to prevent wind from hitting the head and the periphery of the head. If wind hits the head and the periphery of the head, an airflow is generated. If such an airflow is generated, ink mist is likely to be generated.

In view of this, the exhaust channel 202 and the discharge path 34 are blocked as in this configuration, so that the ink mist to be generated by wind hitting the head and the periphery of the head can be reduced, and the amount of the ink mist to be generated can be reduced.

In addition to the above, as the exhaust channel 202 and the discharge path 34 are blocked, it is possible to prevent air from hitting the jetted ink that has been discharged from the head. Thus, the ink can be prevented from being bent by wind while being jetted, and the ink can be accurately landed at a target position.

As the exhaust channel 202 and the discharge path 34 are blocked, the ink can be prevented from adhering to the carriage 12. In addition to that, it is possible to prevent an airflow from being disturbed, and prevent image quality degradation due to a disturbed airflow. Furthermore, the amount of mist floating inside the apparatus can also be reduced.

As described above, the blocker is a member that is installed between the exhaust channel 202 and the discharge path 34, and prevents the exhaust gas flowing in the exhaust channel 202 from flowing into the discharge path. Therefore, the blocker may also serve as an "partition" to partition (separate) the exhaust channel 202 from the discharge path 34.

Therefore, the size, the shape, the material, and the installation position of the blocker have various dimensions and types depending on the relationship between the exhaust channel 202 and the discharge path. As long as the high-temperature gas flowing in the exhaust channel 202 and the discharge path 34 can be separated, the size, the shape, the material, and the installation position or the blocker are not limited to any particular types.

Second Example Configuration

The recording apparatus 10 preferably has an exterior surrounding the irradiators 33. In the example described below, the exterior is a cover 100. The cover 100 is installed at a position as illustrated in FIG. 3, for example.

The cover 100 preferably includes a guide portion. The guide portion is a partition plate 110, for example.

The partition plate 110 is a mechanical component that divides a space. Here, the partition plate 110 is a mechanical component that separates the suction port and the exhaust port from each other.

The guide portion may be a fan or the like. If a fan is used, the outside air can be taken in more strongly.

As the partition plate 110 is installed, it is possible to block the high-temperature gas to be exhausted (hereinafter referred to as the "exhaust gas") from entering the suction port 101, and guide the outside air to the suction port 101. The inside of the housing has a high temperature. The inside of the housing has a complicated airflow. Further, when the temperature of the outside air is lower than the temperature of the gas in the housing, and the outside air can be taken in through the suction port 101, the irradiators 33 can be cooled.

In addition to the above, as the partition plate 110 is installed, it is possible to block the high-temperature gas to be exhausted (hereinafter referred to as the "exhaust gas") from entering the suction port 101, and further cool the irradiators 33.

Accordingly, the partition plate 110 is preferably installed at a position not overlapping with the exhaust channel 202. For example, as illustrated in FIG. 3, the partition plate 110 opens upward, while the exhaust channel 202 faces downward. In this manner, the partition plate 110 is preferably installed at a position and in an orientation at and in which the exhaust gas flowing in the exhaust channel 202 does not enter. Therefore, like the partition plate 110, the guide portion is a mechanical component that divides the space in which a high-temperature gas and the gas to be used for cooling exist.

The size, the shape, the material, the components, the opening direction, and the like of the guide portion are determined by the positional relationship or the like between the suction port 101 and the exhaust channel 202.

As described above, when there is the guide portion that blocks the exhaust gas from entering the suction port 101 and can guide the outside air to the suction port 101, the effect to cool the irradiators 33 can be enhanced.

Third Example Configuration

The blocker preferably blocks a flow of the exhaust gas onto the discharge surface from which the head discharges the ink, and into the space in which the paper sheet W is placed. Specifically, an L-shaped plate 103 having the shape described below is preferable.

Figure 4:
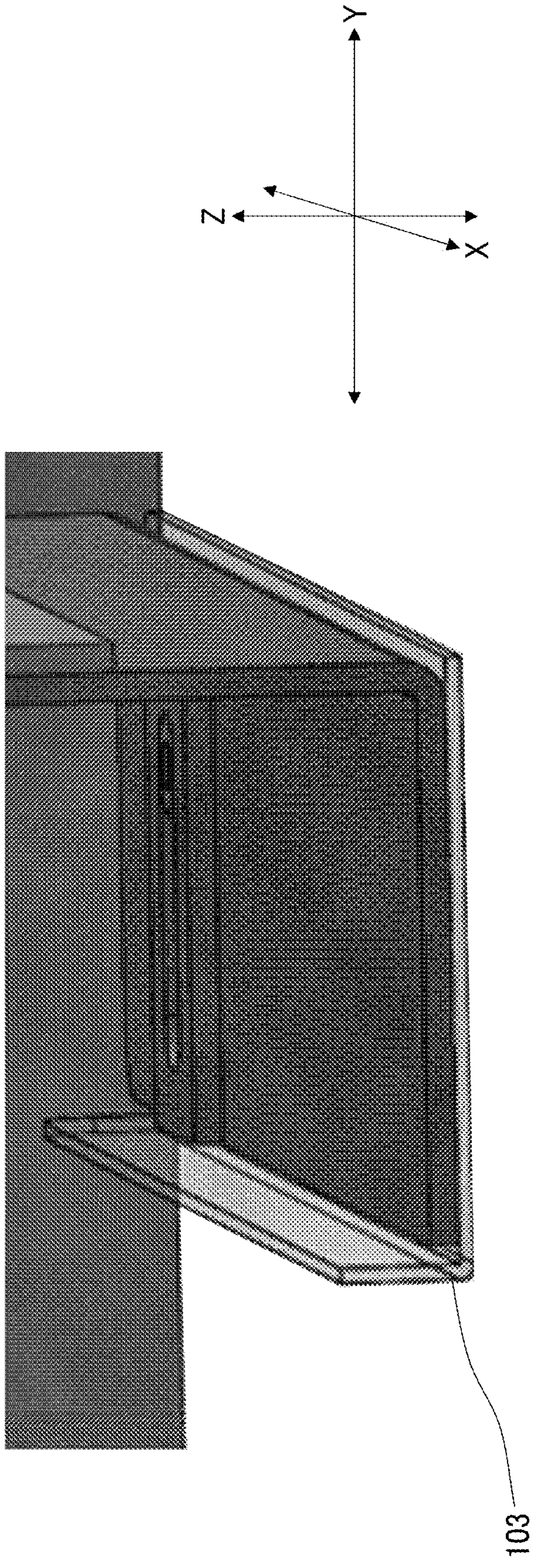
FIG. 4 is a view of an example of an L-shaped plate in a third example configuration.

FIG. 4 is a view of an example of the L-shaped plate in the third example configuration. Specifically, in the example configuration illustrated in FIG. 3, the L-shaped plate 103 is a plate material or the like that closes a gap in the bottom surfaces of the irradiators 33.

In a case where the postures of the irradiators 33 are adjustable, the L-shaped plate 103 may have a slide mechanism or the like so that the gap can be closed in accordance with the postures of the irradiators 33.

In the example configuration illustrated in FIG. 3, a discharge surface 60 and the space in which the paper sheet W is placed (hereinafter referred to as a "placement surface 61") are located at positions lower than the irradiators 33 in the Z-axis.

For example, in the example illustrated in FIG. 3, a gap appears at a gap position 62 or the like. However, the gap position 62 varies depending on the peripheral mechanisms or the like. Therefore, the L-shaped plate 103 is a member installed at a position that closes the discharge surface 60 and the path through which the exhaust gas flows onto the placement surface 61. If there is a gap in the housing of the irradiators 33, the exhaust gas flows through the gap, and easily flows onto the discharge surface 60 and the placement surface 61.

As the flow of the exhaust gas into the discharge surface 60 and the placement surface 61 can be reduced, the ink discharged by the head can be prevented from being bent due to the exhaust gas.

Further, the irradiators 33 may have a degree of freedom in changing the postures. Therefore, it is desirable that, in a case where the postures of the irradiators 33 change, the L-shaped plate 103 can adjust the region to be closed depending on the postures. For example, it is desirable that the L-shaped plate 103 does not have a fixed position or angle, but has a degree of freedom in changing the position or angle in response to a user operation.

Fourth Example Configuration

Figure 5:
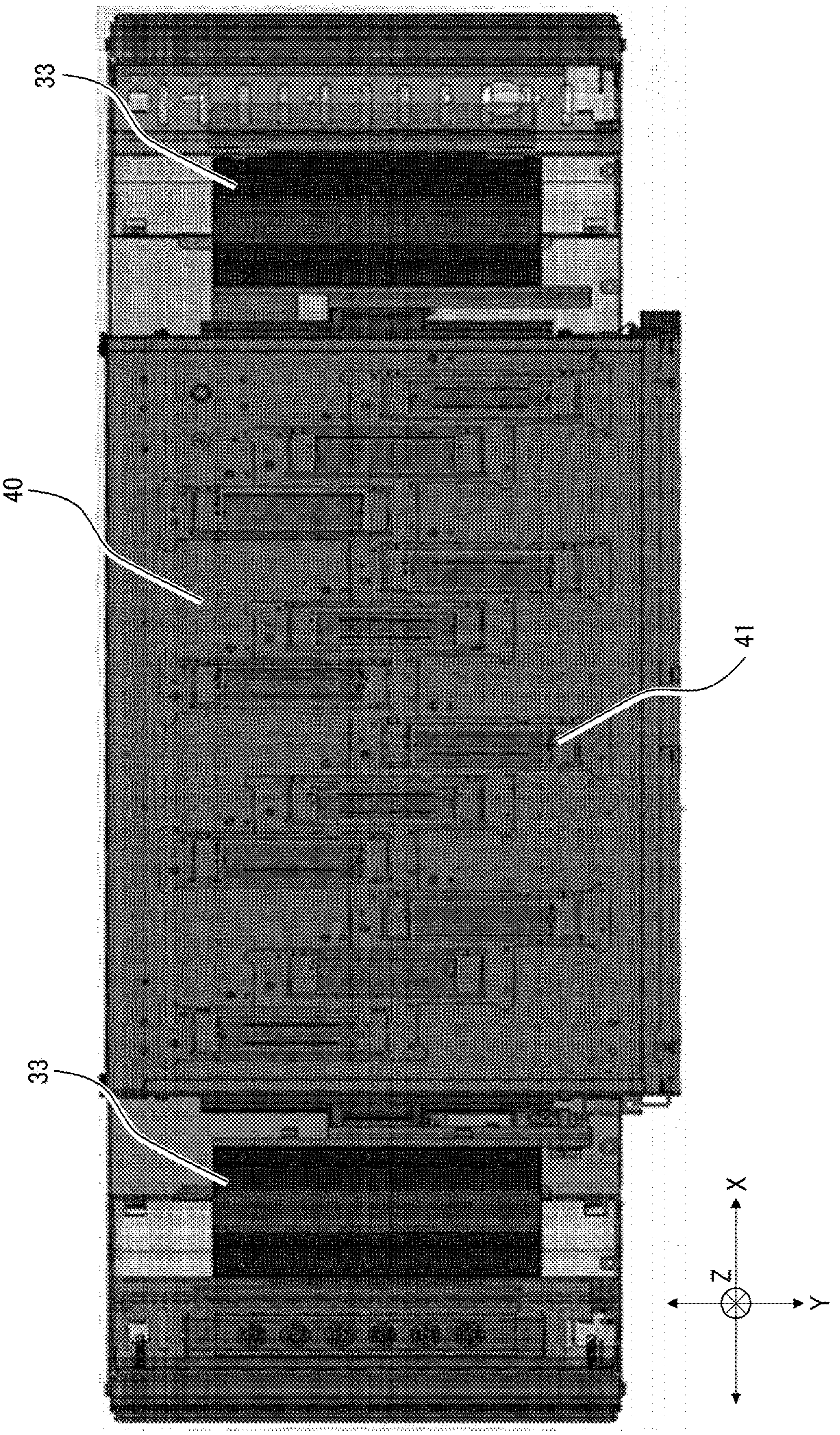
FIG. 5 is a view of an example of a discharge surface.

FIG. 5 is a view of an example of the discharge surface. For example, a plurality of heads 41 is arranged in a staggered manner on the discharge surface, which is the bottom surface of the carriage 12. In the example described below, a securing member for securing the heads 41 is a head plate 40. Specifically, the plurality of heads 41 is disposed on the head plate 40.

In the description below, the positions of the heads 41 are fixed. The heads 41 move together when the carriage scans on the X-axis and the Y-axis.

As a result, a gap is likely to appear around the heads 41 as described below.

Figure 6:
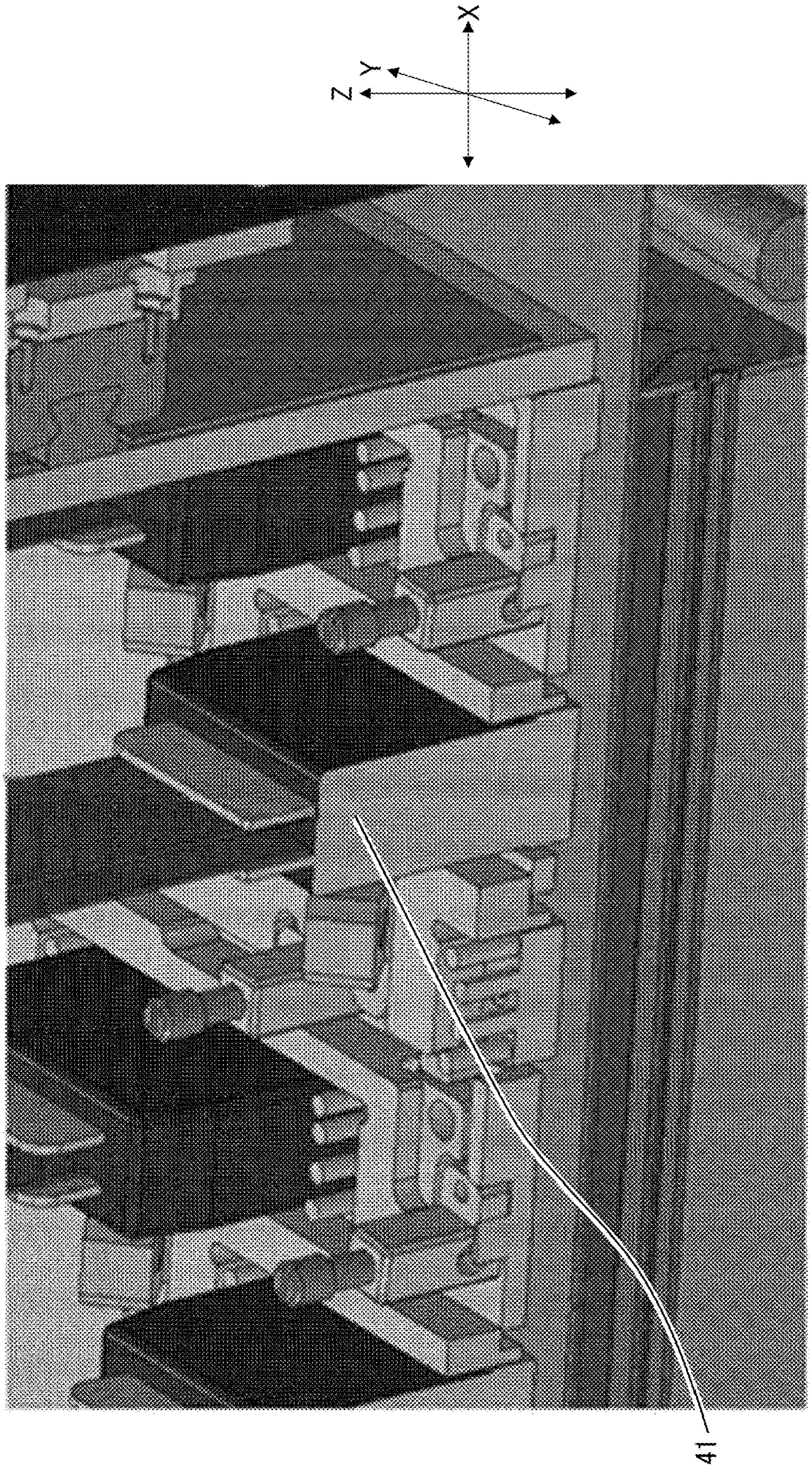
FIG. 6 is a view (part 1) of an example of gaps in a fourth configuration example.

FIG. 6 is a view (part 1) of an example gaps in the fourth example configuration.

Figure 7:
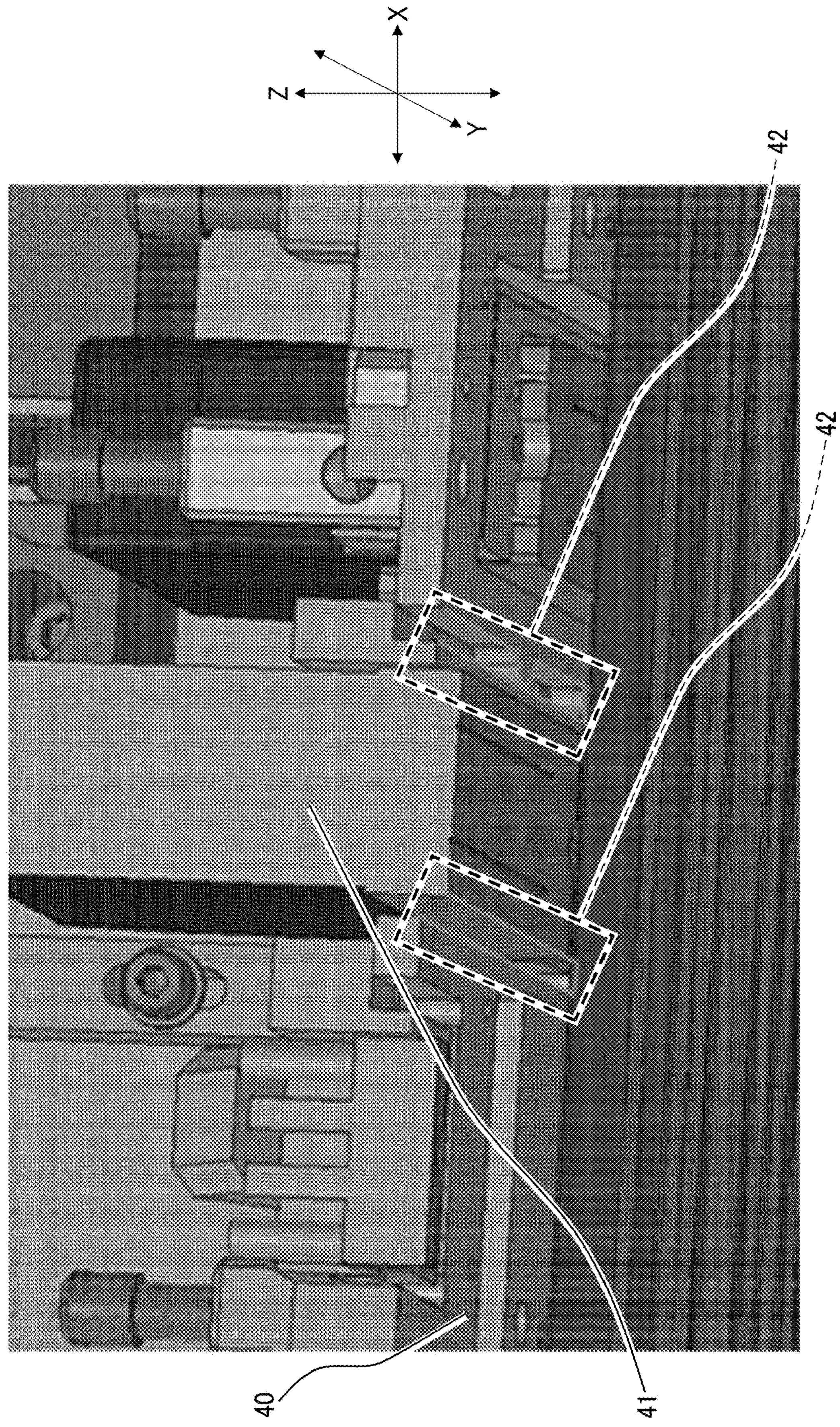
FIG. 7 is a view (part 2) of an example of gaps in the fourth example configuration.

FIG. 7 is a view (part 2) of an example of gaps in the fourth example configuration.

FIGS. 6 and 7 are views of the periphery of the heads 41 illustrated in FIG. 5 as viewed from another viewpoint.

Gaps 42 appear around the heads 41. The positions, the size, the number, the shape, and the ratio of the gaps 42 vary depending on the heads 41, the components mounted around the heads 41, the type of the head plate 40, and the like.

When there are the gaps 42, ink mist easily enters the inside of the apparatus through the gaps 42. If ink mist enters the inside of the apparatus, the ink is deposited on the surface of the electric circuit board. Such ink deposition will result in a failure. Therefore, it is preferable to prepare members that fills the gaps 42 (such members will be hereinafter referred to as "sealing members").

The sealing member are brackets, film, or the like, for example. The sealing members that can fill the gaps 42 may be of any size, shape, material, and the like.

The sealing members are provided, so that entry of ink mist can be prevented as described below.

Figure 8:
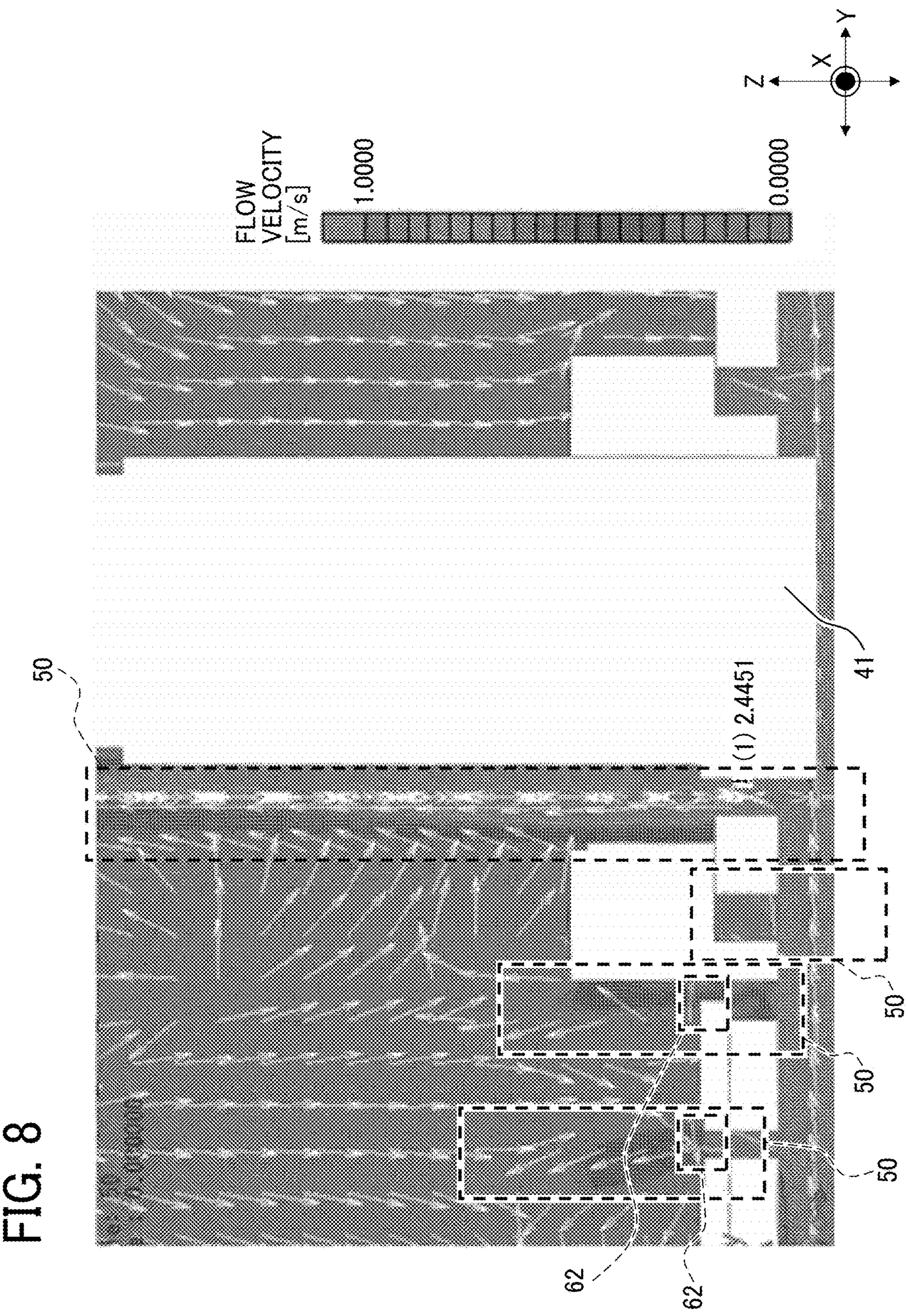
FIG. 8 is a view illustrating a state before closing of gaps.

FIG. 8 is a view illustrating a state before closing of the gaps.

Figure 9:
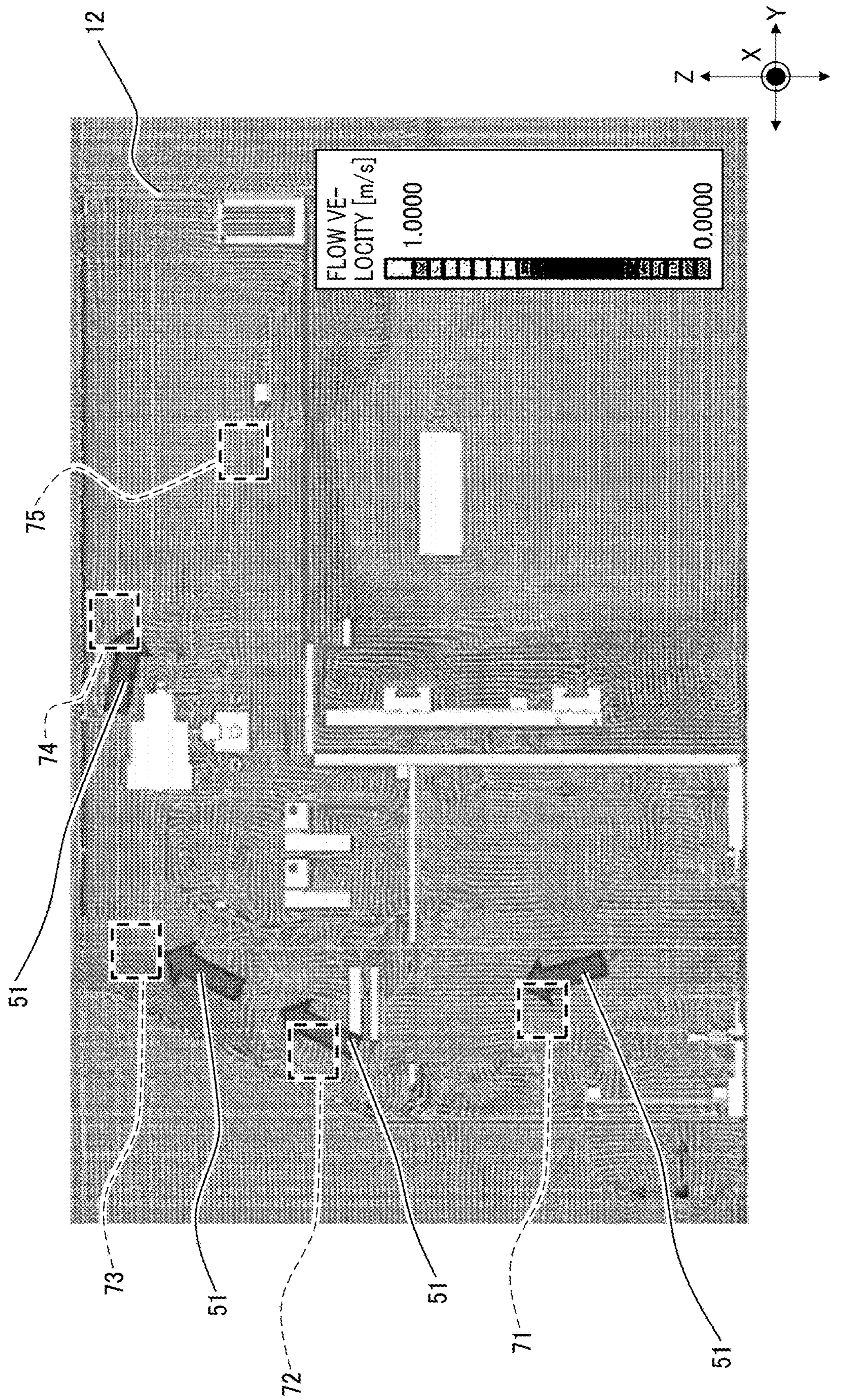
FIG. 9 is a view illustrating the inside of the carriage before closing of gaps.

FIG. 9 is a view illustrating the inside of the carriage before closing of the gaps.

Figure 10:
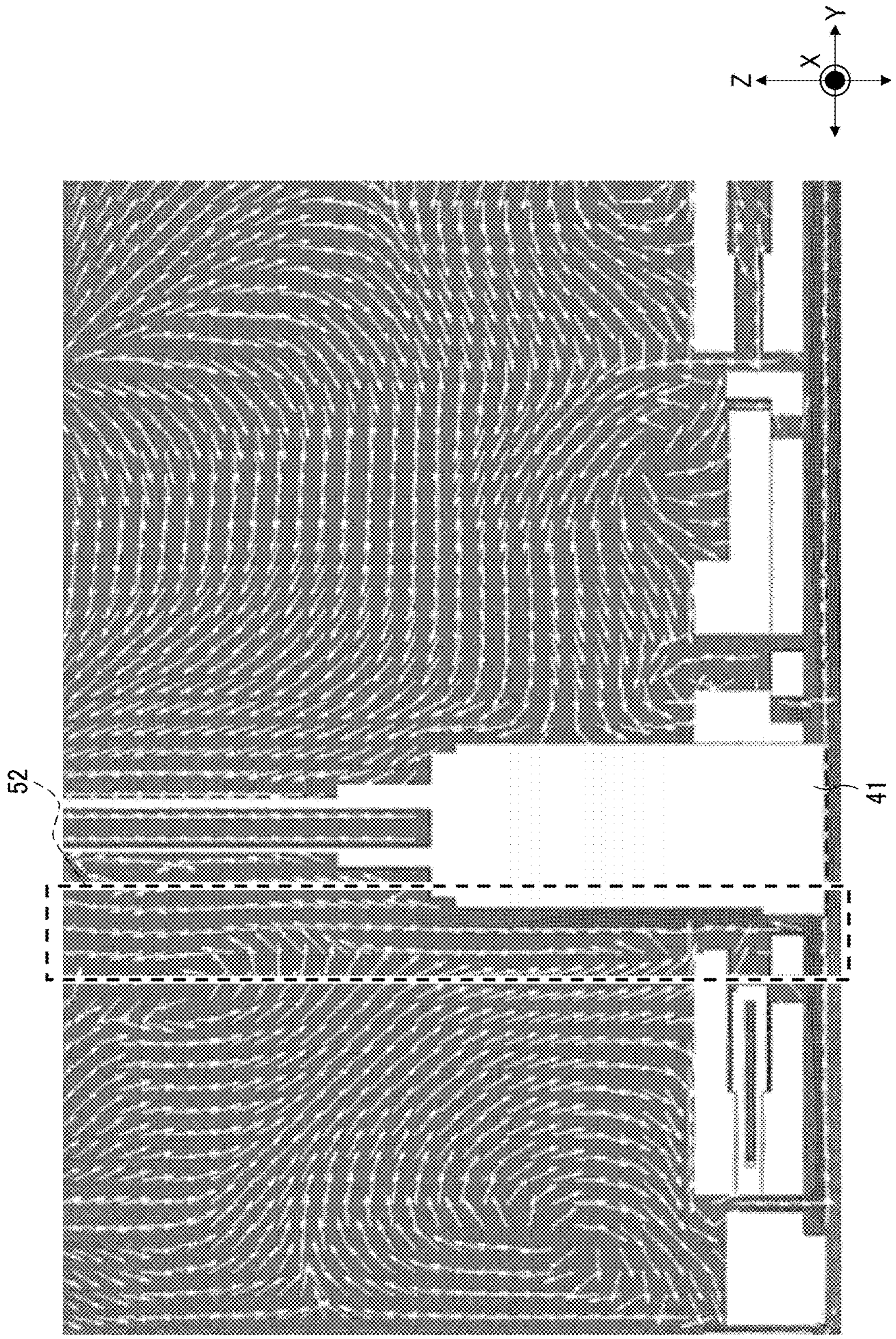
FIG. 10 is a view illustrating a state after closing of gaps.

FIG. 10 is a view illustrating a state after closing of the gaps.

FIGS. 8 and 9 are views illustrating a state before the sealing members are provided. On the other hand, FIG. 10 is a view illustrating a state after the sealing members are provided.

FIGS. 8 and 10 are contour views illustrating a result of simulation of a flow of gas in the periphery of the heads 41 illustrated in FIGS. 6 and 7. FIG. 9 is a view illustrating a flow of gas in the carriage 12. FIGS. 8 to 10 are cross-sectional views.

As illustrated in FIG. 8, if gaps 42 at gap positions 62 are not closed, a strong upward airflow (hereinafter referred to as a "first airflow 50") is generated. Specifically, the first airflow 50 has a flow rate of 0.54 m/s.

When the first airflow 50 is present, an airflow flowing in the carriage 12 (this airflow will be hereinafter referred to as an "in-machine airflow 51") is likely to be generated, as illustrated in FIG. 9. When such an in-machine airflow 51 is generated, the ink adheres to the inside of the machine, and smudges are likely to appear.

On the other hand, when the gaps 42 are closed with sealing members, the upward airflow becomes weaker as illustrated in FIG. 10. Hereinafter, the weakened upward airflow will be referred to as a "second airflow 52". The second airflow 52 has a flow rate of 0.34 m/s. Therefore, when the gaps 42 are closed with sealing members, the wind velocity of the second airflow 52 can be lowered by about 37% from the wind velocity of the first airflow 50.

As illustrated in FIG. 9, the upward airflow from the gaps 42 flows in the carriage 12. This upward airflow contains a large amount of ink mist. Therefore, if the upward airflow flowing into the carriage 12 is strong, a larger amount of ink mist enters the carriage 12, and contaminates the inside of the carriage 12.

The gaps 42 are likely to appear at positions close to the heads 41, to guarantee the heads 41 a degree of freedom. For example, the gaps 42 appear between the heads 41 and a component such as a connector mounted on the head plate 40. The sealing members are provided to seal the gaps 42, so that the first airflow 50 can be weakened like the second airflow 52. As the sealing members are provided in this manner, contamination inside the machine can be reduced as described below.

The following is a description of results of experiments in which transparent base materials are placed at the five locations of a first experimental location 71, a second experimental location 72, a third experimental location 73, a fourth experimental location 74, and a fifth experimental location 75 in FIG. 9, and degrees of contamination are examined.

Figure 11:
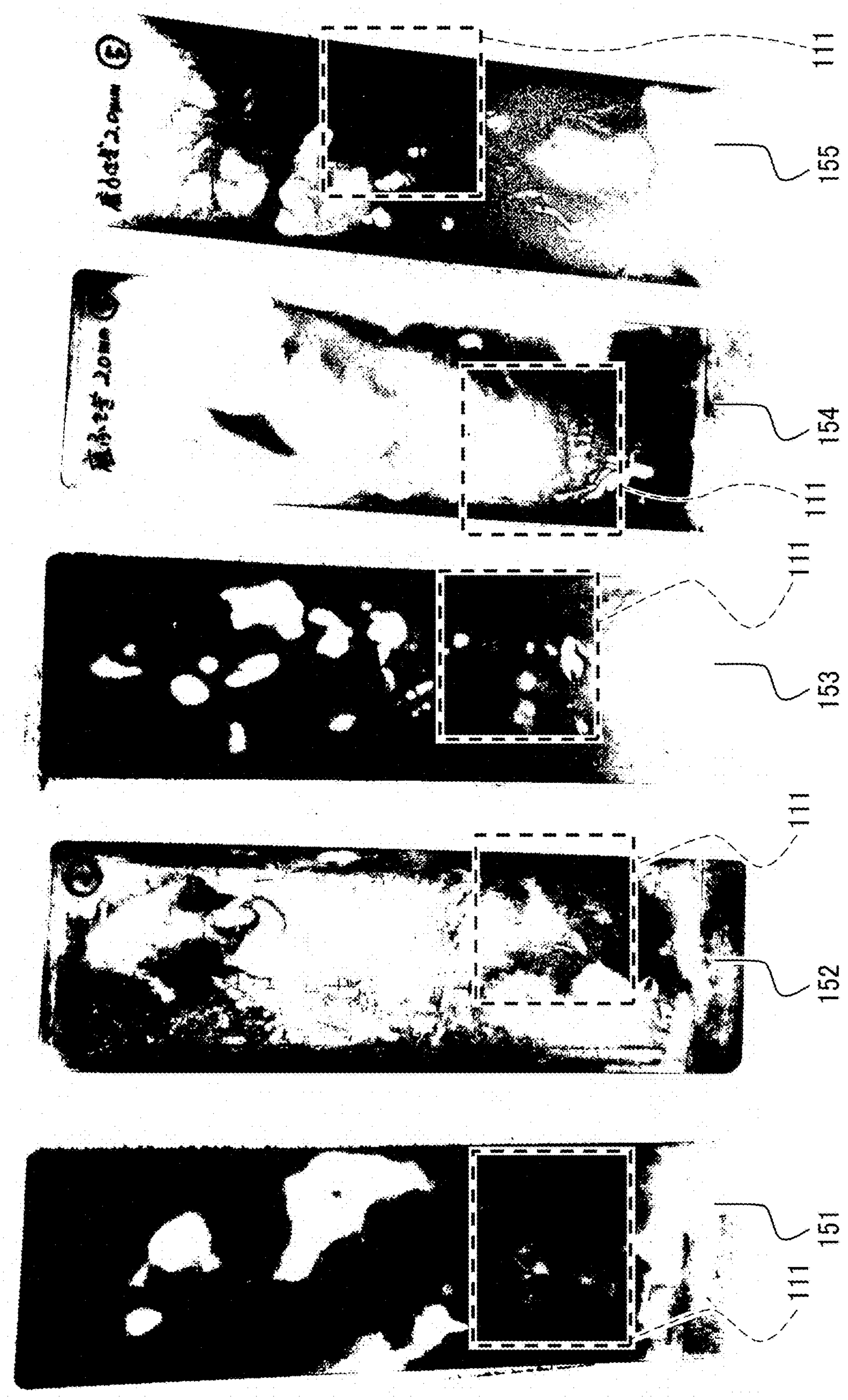
FIG. 11 is a view of comparative examples in which sealing members are not provided.

FIG. 11 is a view of comparative examples in which sealing members are not provided. FIG. 11 is a view illustrating plate materials in the carriage 12. A first comparative material 151 is the transparent base material placed at the first experimental location 71.

A second comparative material 152 is the transparent base material placed at the second experimental location 72. A third comparative material 153 is the transparent base material placed at the third experimental location 73. A fourth comparative material 154 is the transparent base material placed at the fourth experimental location 74. A fifth comparative material 155 is the transparent base material placed at the fifth experimental location 75.

When the sealing members are not provided, adhering portions 111 are formed, and a large amount of contamination appears due to the adhesion of the ink.

Figure 12:
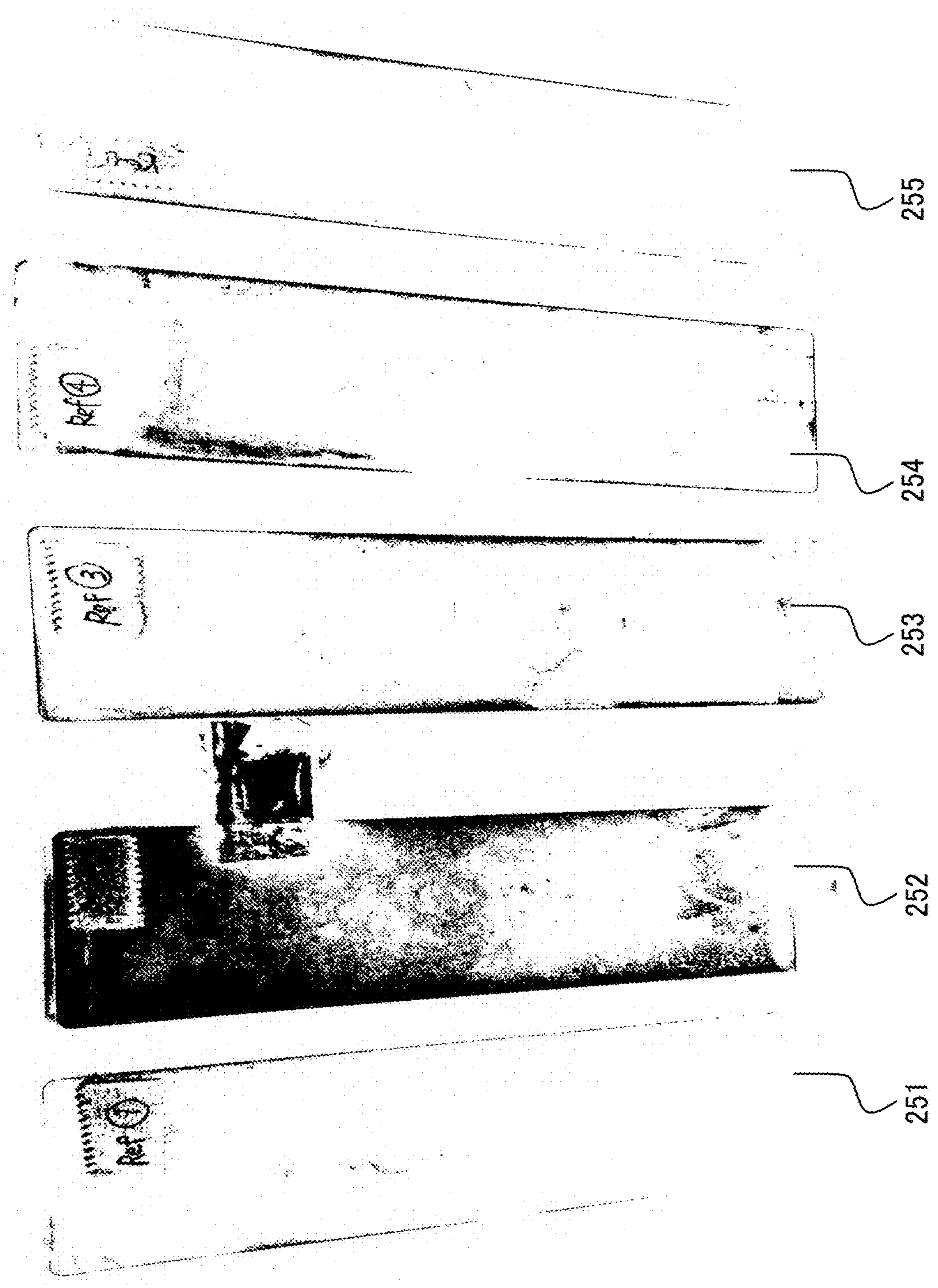
FIG. 12 is a view illustrating an example of the effects of sealing members.

FIG. 12 is a view illustrating an example of the effects of sealing members. FIG. 12 illustrates the same plate materials as the plate materials illustrated in FIG. 11.

As in the comparative examples, the number of experimental locations are five, which are the first experimental location 71, the second experimental location 72, the third experimental location 73, the fourth experimental location 74, and the fifth experimental location 75 in FIG. 9. A first experimental material 251 is the transparent base material placed at the first experimental location 71. A second experimental material 252 is the transparent base material placed at the second experimental location 72. A third experimental material 253 is the transparent base material placed at the third experimental location 73. A fourth experimental material 254 is the transparent base material placed at the fourth experimental location 74. A fifth experimental material 255 is the transparent base material placed at the fifth experimental location 75. In comparison with FIG. 11, when the sealing members are present, the colors of the adhering portions 111 are lighter, and the amount of adhering ink is smaller. As described above, when the sealing members are present, adhesion of ink is reduced, and smudges are reduced. Specifically, the sealing members reduce the ink mist by about 80%. As smudges can be reduced in this manner, it is possible to reduce contamination in the apparatus and failures due to the contamination.

Other Embodiments

A liquid discharge apparatus preferably includes an image forming unit that performs image formation. The image forming unit may be formed with the heads described above, or may be formed with a device that is further provided to perform image formation.

The configuration of the apparatus is not limited to the configuration described above. For example, each device may include components other than the components described above.

The recording medium is a paper sheet (also referred to as "plain paper" or the like), for example. However, the recording medium may be coated paper, label paper, or the like that is not a paper sheet, or even may be an overhead projector sheet, a film, a flexible thin plate, or the like. That is, the material of the recording medium may be a material to which ink droplets can adhere, a material to which ink droplets can temporarily adhere, a material to which ink droplets are attached and fixed, a material to which ink droplets adhere and permeate, or the like. Specifically, the recording medium is a recording medium such as a paper sheet, a film, or cloth, an electronic component such as an electronic substrate or a piezoelectric element (also referred to as a "piezoelectric member" or the like), a powder layer (also referred to as a "powder layer" or the like), an organ model, an inspection cell, or the like. Also, a three-dimensional object may be formed. As described above, the material of the recording medium may be paper, thread, fiber, cloth, leather, metal, plastic, glass, wood, ceramics, a combination of any of these materials, or the like to which droplets can adhere. Furthermore, droplets may contain a recording liquid, a fixing treatment liquid, a resin, or the like, which is not an ink, depending on the above purposes of use.

Modes of the present embodiment include the following modes, for example.

<1> A liquid discharge apparatus that discharges droplets onto a carrier medium, the liquid discharge apparatus including:

a discharging unit that discharges the droplets;

an irradiation unit that irradiates the droplets with light for curing the droplets;

an intake portion that takes a gas for cooling the irradiation unit into a housing of the irradiation unit; an exhaust portion that exhausts, from the housing, an exhaust gas generated when the irradiation unit is cooled with the gas;

an exhaust channel in which the exhaust gas flows; and a blocker that blocks a discharge path extending to a location at which the droplets discharged from the discharging unit land on the carrier medium.

<2> The liquid discharge apparatus of <1>, further including an exterior that surrounds the irradiation unit, in which the exterior includes a guide portion that guides outside air to the intake portion and blocks the exhaust gas from entering the intake portion.

<3> The liquid discharge apparatus of <1> or <2>, in which the blocker blocks the exhaust gas from flowing onto a discharge surface onto which the discharging unit discharges the droplets, and into a space in which the carrier medium is set.

<4> The liquid discharge apparatus of any one of <1> to <3>, further including a sealing member that closes a gap between the discharging unit and a securing member on which the discharging unit is placed.

<5> The liquid discharge apparatus of any one of <1> to <4>, in which the irradiation unit serves as a heat source, the gas taken in by the intake portion cools the heat source, the exhaust portion exhausts the gas having a high temperature, the gas taken in by the intake portion enters the housing through the intake portion and is exhausted as the exhaust gas through the exhaust portion, and the blocker is a sheet metal and is located between the exhaust channel and the discharge path.

<6> The liquid discharge apparatus of any one of <1> to <5>, further including an image forming unit.

<7> The liquid discharge apparatus of any one of <1> to <6>, in which the light includes ultraviolet light, infrared light, or an electron beam.

Aspect 1

A liquid discharge apparatus includes: a head to discharge a liquid onto a medium along a discharge path; an irradiator adjacent to the head to irradiate the liquid on the medium with a curing light to cure the liquid on the medium, the irradiator including a housing; a suction port from which air is inhaled into the housing to cool the irradiator; an exhaust port from which the air is exhausted outside the housing through an exhaust channel; and a partition to separate the exhaust channel from the discharge path.

Aspect 2

The liquid discharge apparatus according to aspect 1 further comprising a cover to cover the irradiator, wherein the cover includes a guide to: guide outside air outside the cover to the suction port; and separate the suction port from the exhaust channel.

Aspect 3

In the liquid discharge apparatus according to aspect 1, the partition separates the exhaust channel from: a discharge face of the head from which the liquid is dischargeable; and a space in which the medium is placed.

Aspect 4

The liquid discharge apparatus according to aspect 1, further includes: a securing member on which the head is secured; and a sealing to seal a gap between the head and the securing member.

Aspect 5

In the liquid discharge apparatus according to aspect 4, the partition is a plate, and the plate is between the exhaust channel and the discharge path.

Aspect 6

The liquid discharge apparatus according to aspect 1 further includes an image forming unit including the head.

Aspect 7

In the liquid discharge apparatus according to aspect 1, the curing light having ultraviolet light, infrared light, and electron beam.

Aspect 8

In the liquid discharge apparatus according to aspect 1, the exhaust port is below the suction port.

Aspect 9

In the liquid discharge apparatus according to aspect 2, the guide is slanted toward the suction port to guide the outside air downward to the suction port.

The present embodiment is not limited to each embodiment described above as an example. Therefore, in the present embodiment, components can be added or modified without departing from the technical scope. Because of this, all technical matters included in the technical idea disclosed in the claims are subject to the present embodiment. The embodiments described above as examples are specific examples suitable for implementation. A person skilled in the art can make various modifications from the disclosed contents, and such modifications are included in the technical scope disclosed in the claims.

Any one of the above-described operations may be performed in various other ways, for example, in an order different from the one described above. The methods described above can be provided as program codes stored in a recording medium, to cause a processor to execute the method when executed by at least one processor.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

The invention claimed is:

1. A liquid discharge apparatus comprising:
- a head to discharge a liquid onto a medium along a discharge path;
- an irradiator adjacent to the head to irradiate the liquid on the medium with a curing light to cure the liquid on the medium, the irradiator including a housing;
- a suction port from which air is inhaled into the housing to cool the irradiator;
- an exhaust port from which the air is exhausted outside the housing through an exhaust channel; and
- a partition to separate the exhaust channel from the discharge path,
- wherein the partition is a L-shaped plate, and
- wherein the L-shaped plate is between the exhaust channel and the discharge path.

2. The liquid discharge apparatus according to claim 1, further comprising a cover to cover the irradiator,
- wherein the cover includes a guide to:
  - guide outside air outside the cover to the suction port; and
  - separate the suction port from the exhaust channel.

3. The liquid discharge apparatus according to claim 2,
- wherein the guide is slanted toward the suction port to guide the outside air downward to the suction port.

4. The liquid discharge apparatus according to claim 1,
- wherein the partition separates the exhaust channel from:
  - a discharge face of the head from which the liquid is dischargeable; and
  - a space in which the medium is placed.

5. The liquid discharge apparatus according to claim 1, further comprising:
- a securing member on which the head is secured; and
- a sealing to seal a gap between the head and the securing member.

6. The liquid discharge apparatus according to claim 1, further comprising an image forming unit including the head.

7. The liquid discharge apparatus according to claim 1,
- wherein the curing light having ultraviolet light, infrared light, and electron beam.

8. The liquid discharge apparatus according to claim 1,
- wherein the exhaust port is below the suction port.

9. The liquid discharge apparatus according to claim 1,
- wherein the L-shaped plate has:
  - one face parallel to and along a discharge face of the head, and
  - another face perpendicular to the one face and extending vertically to face the exhaust port, and wherein the L-shaped plate is configured to direct the air exhausted outside the housing away from the discharge path.

* * * * *